United States Patent
Hines, III et al.

(10) Patent No.: US 8,761,719 B1
(45) Date of Patent: Jun. 24, 2014

(54) SYSTEMS AND METHOD FOR PROVISIONING LOCATION DETERMINATION SYSTEMS

(75) Inventors: Thomas Edward Hines, III, Belton, MO (US); Larry S. Meyers, Overland, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1783 days.

(21) Appl. No.: 12/022,841

(22) Filed: Jan. 30, 2008

(51) Int. Cl.
*G01S 5/14* (2006.01)

(52) U.S. Cl.
USPC ................................. 455/404.2; 455/456.2

(58) Field of Classification Search
CPC ............................. H04W 64/003; G01S 5/14
See application file for complete search history.

(56) References Cited

U.S. PATENT DOCUMENTS

| | | | |
|---|---|---|---|
| 6,801,850 B1 * | 10/2004 | Wolfson | 701/209 |
| 7,933,610 B2 * | 4/2011 | Maher et al. | 455/456.1 |
| 8,289,953 B2 * | 10/2012 | Ray et al. | 370/352 |
| 2004/0203909 A1 * | 10/2004 | Koster | 455/456.1 |
| 2005/0085239 A1 * | 4/2005 | Cedervall | 455/456.1 |
| 2005/0255865 A1 * | 11/2005 | Sillasto et al. | 455/456.5 |
| 2006/0194592 A1 * | 8/2006 | Clough | 455/456.3 |
| 2006/0286961 A1 * | 12/2006 | Levitan | 455/404.2 |
| 2006/0293023 A1 * | 12/2006 | Levitan | 455/404.2 |
| 2007/0004378 A1 * | 1/2007 | Muhonen | 455/404.2 |
| 2007/0178834 A1 * | 8/2007 | Wahlberg et al. | 455/12.1 |
| 2008/0085699 A1 * | 4/2008 | Hirano et al. | 455/414.2 |
| 2008/0172496 A1 * | 7/2008 | Middleton et al. | 709/246 |
| 2008/0311927 A1 * | 12/2008 | Boman et al. | 455/456.1 |
| 2009/0003312 A1 * | 1/2009 | Velazquez et al. | 370/352 |
| 2009/0005052 A1 * | 1/2009 | Abusch-Magder et al. | 455/446 |
| 2009/0005062 A1 * | 1/2009 | Takaku et al. | 455/456.1 |
| 2010/0142442 A1 * | 6/2010 | Pandey et al. | 370/328 |

* cited by examiner

*Primary Examiner* — Marcos Batista
*Assistant Examiner* — Frank Donado

(57) ABSTRACT

New location information that is different from the old location information being used by location determination system is received by a provisioning system. A location change metric is determined from the old and new location information. The location determination system is provisioned by the provisioning system with the new location information if the location change metric meets certain criteria.

14 Claims, 7 Drawing Sheets

| Market | Switch Number | Cell ID | Sector ID | Location | Location Properties | Sector Properties |
|--------|---------------|---------|-----------|----------|---------------------|-------------------|
| Denver | 7 | 14 | 270 | 509293E 4483057N | PSAP=1 Certainty=4 | Shape=3 Adj=3-90;... |
| ... | ... | ... | ... | ... | ... | ... |

FIGURE 4

SYSTEMS AND METHOD FOR PROVISIONING LOCATION DETERMINATION SYSTEMS

TECHNICAL BACKGROUND

Telecommunication carriers are required by government regulations to provide emergency calling services to their customers. In the United States and Canada, 911 is the official emergency phone number that callers can dial in order to reach dispatch personnel at a public safety answering points (PSAP). When a caller dials 911 from a telephone, the call is routed by a carrier to receiving equipment at a PSAP facility. A dispatcher at the facility answers the call and assists the caller with their emergency.

Often times, dispatchers must dispatch first responder personnel to the scene of an emergency to render assistance to callers. In the past, dispatchers had to ask a caller for his location. Over time, most telecommunication carriers developed the capability to automatically determine the location of caller who dialed 911 via a landline. For instance, 911 callers on a landline can be located based on their phone number. In the case of broadband 911 voice calls, callers can be located based on the identity of their broadband equipment.

During the course of a 911 call made from a mobile phone, a PSAP or other emergency services provider may request the carrier determine the approximate location of a mobile 911 caller. Once the carrier determines an approximate location of a mobile caller, this information may be relayed to the PSAP. One method of providing this approximate location is to give the requestor the location of the radio tower servicing the 911 call. This approximate location may also be used to determine which PSAP should receive the 911 call.

Government regulations, however, do not allow a carrier to make certain changes to its location determinations without following certain procedures or meeting certain standards. For example, consider the case where a carrier moves a cell tower from inside city limits to outside city limits and this new location would result in new location information being provided by the carrier to a PSAP. For example, this new location may change the PSAP that services the mobile 911 calls routed through that tower from the municipal PSAP to the county PSAP. To make this change, one or both of the county and municipal PSAP's may need to consent.

To obtain this consent, or otherwise satisfy the requirements of a regulatory scheme, time consuming or expensive procedures or tests may need to be conducted such as a drive test. A drive test may involve sending personnel out to various locations in a PSAP's service area to determine if the routing of mobile 911 calls is to the proper PSAP. Or a drive test may check that the location being provided by the carrier meets certain accuracy criteria. Accordingly, because changing the information used to make mobile 911 location determinations might effect the location determinations provided by the carriers location determination equipment, there is a problem modifying the information used to make mobile 911 call location determinations without incurring possibly unnecessary expense and time consuming procedures.

OVERVIEW

In an embodiment of the invention, new location information that is different from the old location information being used by location determination system is received. A location change metric is determined from the old and new location information. The location determination system is provisioned with the new location information if the location change metric meets certain criteria.

An embodiment of the invention comprises a first information transfer link that receives new location information. The new location information is different from the old location information being used by a location determining system. A location change metric determining system determines a location change metric from the old and new location information. An information transfer link communicates the new location information to the location determination system if the location change metric meets a certain criteria.

BRIEF DESCRIPTION OF THE DRAWINGS

FIG. 4 illustrates a database of location information that may be used by location determination system.

DETAILED DESCRIPTION

Figure 1:
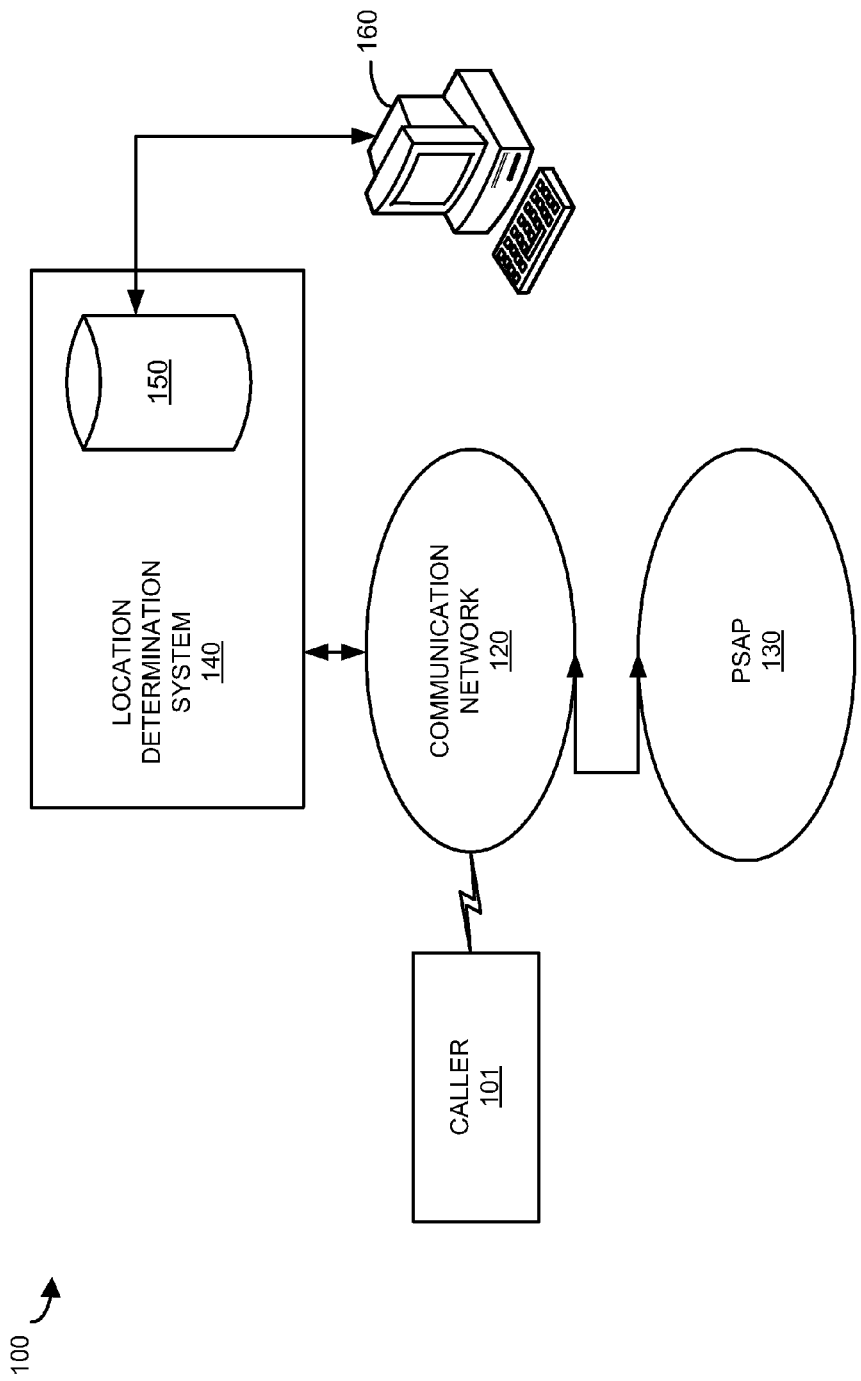
FIG. 1 is a block diagram illustrating a system that provides new location information to emergency service providers.

FIG. 1 is a block diagram illustrating a system that provides new location information to emergency service providers. Communication network 100 includes caller 101, communication network 120, public safety answering point (PSAP) 130, and location determination system (LDS) 140, and location provisioning system (LPS) 160. LDS 140 includes location information database (LID) 150. Caller 101 is operatively coupled to communication network 120. LPS 160 is operatively coupled with LDS 140, and in particular, with LID 150. PSAP 130 is also operatively coupled with communication network 120 and thereby also operatively coupled with caller 101.

Communication network 120 could be any network or collection of networks that couple, link, or otherwise operatively connect caller 101 with other callers or PSAP 130. It should be understood that communication network 120 may also connect PSAP 130 with LDS 140, or LDS 140 and LPS 160. However, other secondary data networks could be used. In an example, communication network may include a backhaul network, a local network, a long distance network, or a packet network, or any combination thereof, as well as other types of networks.

Caller 101 may be any device, system, or other such communication platform capable of communicating with LDS 140 and PSAP 130 over communication network 120. Caller 101 may be, for example, a mobile phone, a wireless phone, a personal digital assistant (PDA), a wireline phone, or any combination thereof, as well as any other type of device or system. Other types of communication platforms are possible.

LPS 160 may be any system or collection of systems capable of communicating with LDS 140 to provision LDS with data or updates to data (a.k.a. location information) that is used by LDS to determine or help determine the an approximate location corresponding to caller 101. LPS may also be capable of interacting directly or indirectly with any location information used by LDS to determine or help determine the location of caller 101 such as location information database 150. LDS 140 may be part of, for example, a mobile switching center (MSC), a soft switch, a media gateway controller, or any combination or variation thereof, as well as another type of call locating system.

Location determining system 140 could be any system or collection of systems, such as location information database 150, capable of determining an approximate location of callers to emergency services or a PSAP. In an example, location information database 150 could be part of mobile positioning centers (MPC). It should be understood that location determining system 140 may include additional elements not pictured for the sake of clarity. For example, position determining equipment (PDE) may be included. Furthermore, a gateway system may be included to interface between PSAP 130 and location information database 150. An example of a gateway is an automatic location identification (ALI) gateway or database query engine.

Figure 2:
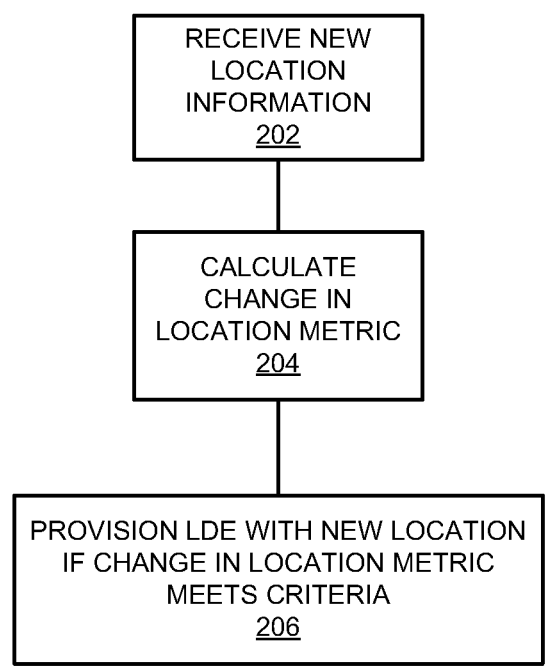
FIG. 2 is a flow diagram illustrating a method for provisioning location determination system with new location information.

FIG. 2 is a flow diagram illustrating a method for provisioning location determination system with new location information. In a step 202, new location information is received by location provisioning system 160. For example, this new location information may be new latitude and longitude coordinates for the location of a radio tower that has been moved.

Another example of new location information is new latitude and longitude coordinates for the centroid of the radio wave radiation pattern, reception pattern, or coverage area corresponding to a tower or cell sector after a change has been made to the tower's antenna. Yet another example of new location information is new latitude and longitude coordinates for the centroid of the radio wave radiation pattern, reception pattern, or coverage area corresponding to a tower or cell sector that results from new radio wave propagation modeling techniques such as a new or improved computer models.

Another example of new location information is new latitude and longitude coordinates for the centroid of the radio wave radiation pattern, reception pattern, or coverage area that results from changing a tower or cell sector's frequency band of operation (e.g. from the 800 MHz band to the 850 MHZ band.). New location information may be new latitude and longitude coordinates for the centroid of a cell sector service area that results from changes to other towers or cell sectors so that the area serviced by a tower or sector, and therefore the coordinates that specify the centroid of its service area, changes.

It should be understood that the examples given above are within the scope of the invention. In addition, other possible changes, or reasons for changing the location information exist and within the scope of the invention. It is also within the scope of the invention that the new location information may be based upon these changes to the location information, or reasons for changing the location information, and any combination of, or result of, one or more of the examples given above.

In a step 204, the location provisioning system calculates a change in location metric. For example, this metric may be the distance in meters from old latitude and longitude coordinates to new latitude and longitude coordinates. In another example, the metric may be whether a new location falls within the service area of a different PSAP than the old location. In another example, the metric may represent an area that is correlated to the difference in service coverage areas represented by the old and new location information.

In another example, the metric may represent a change in signal strength at a particular location or over a particular area. An example of a particular location may be the centroid of the old location information or the location of the local sheriff's office complex. An example of a particular area may be a particular city block or some or all of the old location information's cell sector service area. All of these examples are within the scope of the invention. In addition, other possible change in location metrics exist and are also within the scope of the invention. It is also within the scope of the invention that a change in location metric may be based upon these other metrics and any combination of, or result of, one or more of the change in location metric examples given above.

In a step 206, location determining system is provisioned with the new location information by location provisioning system 160 if the change in location metric meets a criteria. Location provisioning system 160 may provision location determination system with the new location information by changing an entry or record in location information database 150. An example of criteria that the change in location metric may meet is that the new location information represents a point that is less than a certain distance from the point represented by the old location information. (E.g. the new point is only 1 meter from the old point. This is not a significant change so the new location may be used.)

Another example of criteria is whether the new location information would result in a change to the PSAP servicing all or some percentage of the calls associated with the old location information. Another example of criteria is the amount of change in service coverage areas represented by the new location information and the old location information falling below, or exceeding, a threshold value. Another example of criteria is the amount of signal strength change at a particular location or over a particular area falling below, or exceeding, a threshold value. All of these examples are within the scope of the invention. In addition, other possible criteria exist and are also within the scope of the invention. It is also within the scope of the invention that the criteria may be based upon these other criteria and any combination of, or result of, one or more of the example criteria given above.

Figure 3:
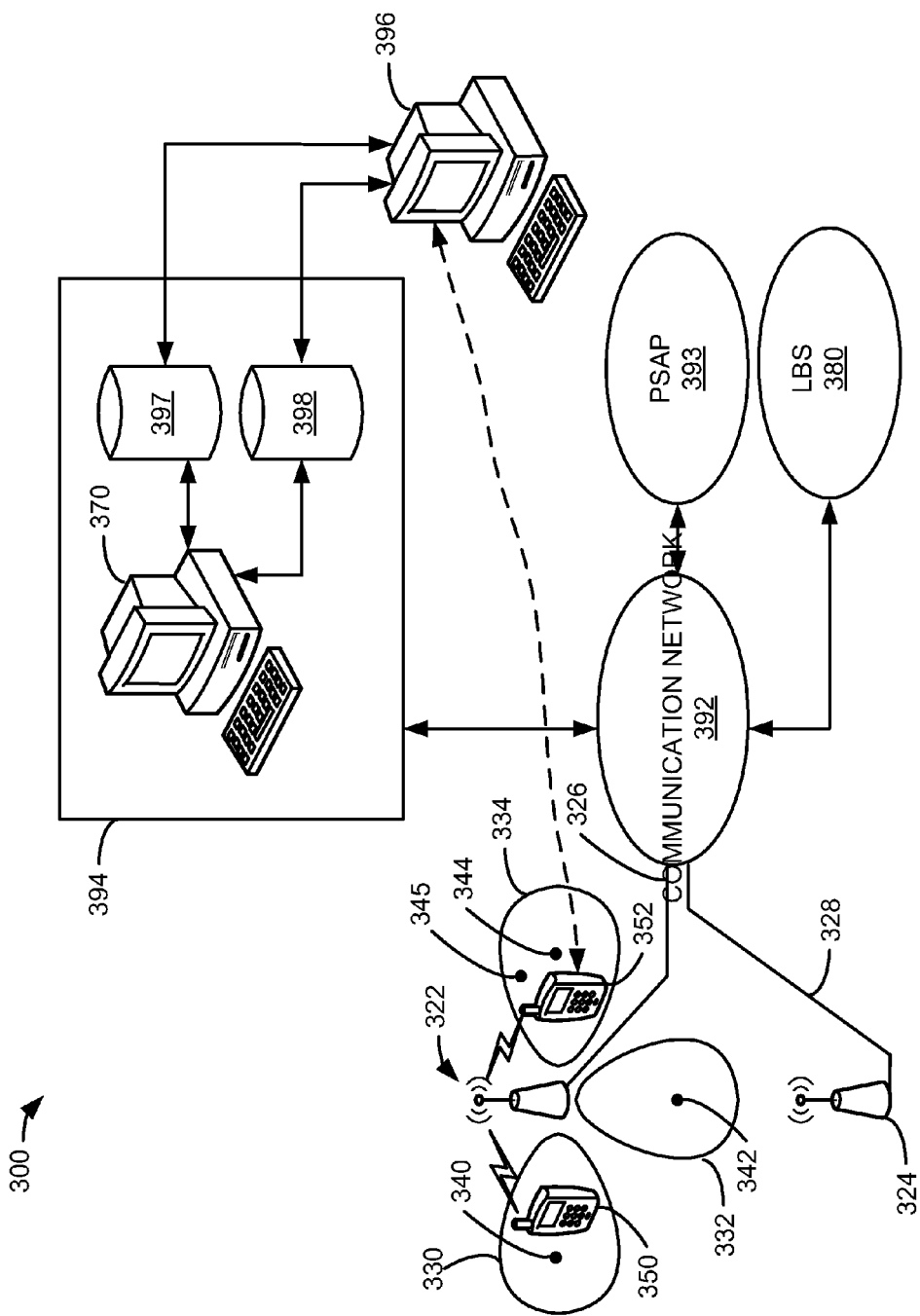
FIG. 3 is a block diagram illustrating a system that provisions location determination system with new location information and provides location determinations to a PSAP.

FIG. 3 is a block diagram illustrating a system that provisions a location determination system with new location information and provides location determinations to a PSAP. System 300 includes caller 350, communication network 392, public safety answering point (PSAP) 393, and location determination system (LDS) 394, location provisioning system (LPS) 396, and location based services (LBS) 380. LDS 394 includes first location information database (LID) 397 and second location information database 398. Caller 350 is operatively coupled to communication network 392. LPS 396 is operatively coupled with LDS 394, and in particular, with LIDs 397 and 398. PSAP 393 is also operatively coupled with communication network 392 and thereby also operatively coupled with caller 350.

Communication network 392 may be any network or collection of networks that couple, link, or otherwise operatively connect caller 350 with other callers or PSAP 393. It should be understood that communication network 392 may also connect PSAP 393 with LDS 394, or LDS 394 and LPS 396. It should be understood that communication network 392 may also connect LBS 380 with LDS 394, or LDS 394 and LPS 396. However, other secondary data networks may be used. In an example, communication network may include a backhaul network, a local network, a long distance network, or a packet network, or any combination thereof, as well as other types of networks.

Caller 350 may be any device, system, or other such communication platform capable of communicating with LDS 394 and PSAP 393 over communication network 392. Caller 350 may be, for example, a mobile phone, a wireless phone, or a wireline phone, or any combination thereof, as well as any other type of device or system. Other types of communication platforms are possible.

LPS 396 may be any system or collection of systems capable of communicating with LDS 394 to provision or re-provision LDS with data or updates to the data that is used by LDS to determine or help determine the location of caller 350. LPS may also be capable of interacting directly or indirectly with any location information used by LDS to determine or help determine the location of caller 350 such as first and second LIDs 397 and 398. LDS 394 may be part of, for example, a mobile switching center (MSC), a soft switch, a media gateway controller, or any combination or variation thereof, as well as another type of call locating system.

Location determining system 394 may be any system or collection of systems, such as first LID 397, second LID 398, and computer system 370 capable of determining an approximate location of caller 350. Computer system 370 may contain, or interact with first or second LID 397 or 398, respectively. In an example, first and second LIDs 397 and 398, and computer system 370, may be part of a mobile positioning center (MPC). It should be understood that location determining system 394 may include additional elements not pictured for the sake of clarity. For example, additional position determining equipment (PDE) may be included. Furthermore, a gateway system may be included to interface between PSAP 393 and first LID 397. Another gateway system may be included to interface between LBS 380 and second LID 398. An example of a gateway is an automatic location identification (ALI) gateway or database query engine.

Base stations 322 and 324 are operatively coupled to communication network 392, and thereby to PSAP 393, LDS 394, LPS 396, LBS 380 and first and second LIDs 397 and 398. Base stations 322 and 324 are operatively coupled to communication network 392 by at least communication links 326 and 328, respectively. In FIG. 3, base station 322 is shown, for exemplary purposes, to have three cell sectors 330, 332 and 334 which are depicted as their respective coverage areas 330, 332, and 334. This is for the purposes of illustration and base stations 322 or 324 may have a different number of cell sectors. In FIG. 3, base station 322 is shown to be operatively coupled to caller 350. Caller 350 is shown to be in the coverage area for cell sector 330. This represents that caller 350 is being serviced by cell sector 330.

FIG. 3 also shows mobile measuring device 352. Mobile measuring device 352 is shown to be operatively coupled to base station 322. Mobile measuring device is shown to be in the coverage area for cell sector 334. This represents that mobile measuring device is making measurements that relate to cell sector 334. Mobile measuring device is also shown to be operatively linked to location provisioning system 396. This represents that measurements taken by mobile measuring device may be transferred to location provisioning system 396. Mobile measuring device 350 may be used to perform detailed cell sector analysis or checks such as a drive test.

Locations 340, 342, 344 are shown to be in the coverage areas for cell sectors 330, 332, and 342, respectively. Location 345 is shown to be in the coverage area for cell sector 334, but in a different place than location 344.

FIG. 4 illustrates a database of location information that may be used by location determination system. The database illustrated in FIG. 4 may reside in first or second LID 397 or 398, respectively. FIG. 4 illustrates a database, in table form, with seven or more exemplary fields. Those fields are named: Market, Switch Number, Cell identification, Sector identification, Location, Location Properties, and Sector Properties. Of course, there could be more or less than this number of fields, and the fields depicted in FIG. 4 and their names are for illustrative purposes only.

An exemplary entry for each of these fields is also shown in FIG. 4. In FIG. 4, the exemplary entry has: Denver in the Market field; 7 in the Switch Number field; 14 in the Cell ID field, 270 in the Sector ID field; 509293E and 4483057N in the Location field; PSAP=1 and Certainty=4 in the Location Properties field; and, Shape=3 and Adj=3-90 in the Sector Properties field. The Market, Switch Number, Cell identification, and sector identification may form a unique key that uniquely identifies a cell sector. For example, the combination of Market, Switch Number, Cell ID, and Sector ID values shown in the exemplary entry in FIG. 4 may uniquely identify cell sector 330. Cell sectors 342 and 344 would have a different combination of Market, Switch Number, Cell ID, and Sector ID values.

Accordingly, to retrieve location information for cell sector 330, LDS 394 may query first or second LID 397 or 398 with the Market, Switch Number, Cell ID, and Sector ID values of Denver, 7, 14 and 270, respectively. In response, first or second LID 397 or 398 would, in this example, return the values shown in FIG. 4 for Location, Location Properties, and Sector Properties. These values of Location, Location Properties, and Sector Properties may be used by LDS 394 to determine or help determine a location that is then passed to either PSAP 393 or LBS 380.

To illustrate by example how the database and database entry illustrated FIG. 4 may be used by LDS 394, consider the system shown in FIG. 3. Consider the case where caller 350 places a call. Since caller 350 is located in cell sector 330, and base station 322 services the calls in cell sector 330, (as well as those calls in 332 and 334) this call is serviced by base station 322 which passes the call information (which may include, for example, Market, Switch Number, Cell ID and Sector ID of the cell sector servicing the caller 350) and call content to communication network 392 over communication link 326. If, for example, PSAP needs a location corresponding to caller 350, it may pass a request to communication network 392. Communication network 392 may then forward that request to LDS 394.

LDS 394 may also receive from communication network 392, the Market, Switch Number, Cell ID, and Sector ID values of Denver, 7, 14 and 270, respectively. LDS 394 may then query first LID 397 or second LID 398 with the unique key of Denver, 7, 14, and 270 for the fields Market, Switch Number, Cell ID, and Sector ID. In response to this query, LDS 394 would receive back the location information of: 509293E and 4483057N in the Location field; PSAP=1 and Certainty=4 in the Location Properties field; and, Shape=3 and Adj=3-90 in the Sector Properties field. This location information may then be used by LDS 394 to determine a location to be given to PSAP 393 in response the request PSAP 392 made for a location corresponding to caller 350. For example, LDS 394 may simply send PSAP 392 the contents of the Location field which may correspond to a latitude and longitude for the centroid of cell sector 330.

LDS 394 may also send additional information retrieved from first or second LID 397 or 398 to PSAP 392. For example, LDS 394 may also send the information retrieved in the Location Properties field to the PSAP. In the example database entry of FIG. 4, the Location Properties field returned PSAP=1 and Certainty=4 which, for example, may tell the PSAP that it is the correct PSAP to be servicing the call from caller 350 (since the number 1 corresponds the PSAP servicing caller 350) and that the location information being provided by LDS 394 is accurate to 4 meters.

LDS 394 may also combine the information retrieved with other information to determine a location to send to PSAP 392. For example, LDS 394 may combine signal strength information it receives from base station 322 via communication network 392 with the contents of the Location field and the contents of the Sector Properties field to determine a location to send to PSAP 392. For example, if base station 322 reported that the signal strength of caller 350 was approximately equal for cell sectors 330 and 332, LDS may average locations 340 and 342 and send that as the location of caller 350 to PSAP 392. Other methods which use other data, either obtained from first or second LID 397 or 398, or other sources are also possible.

Figure 5:
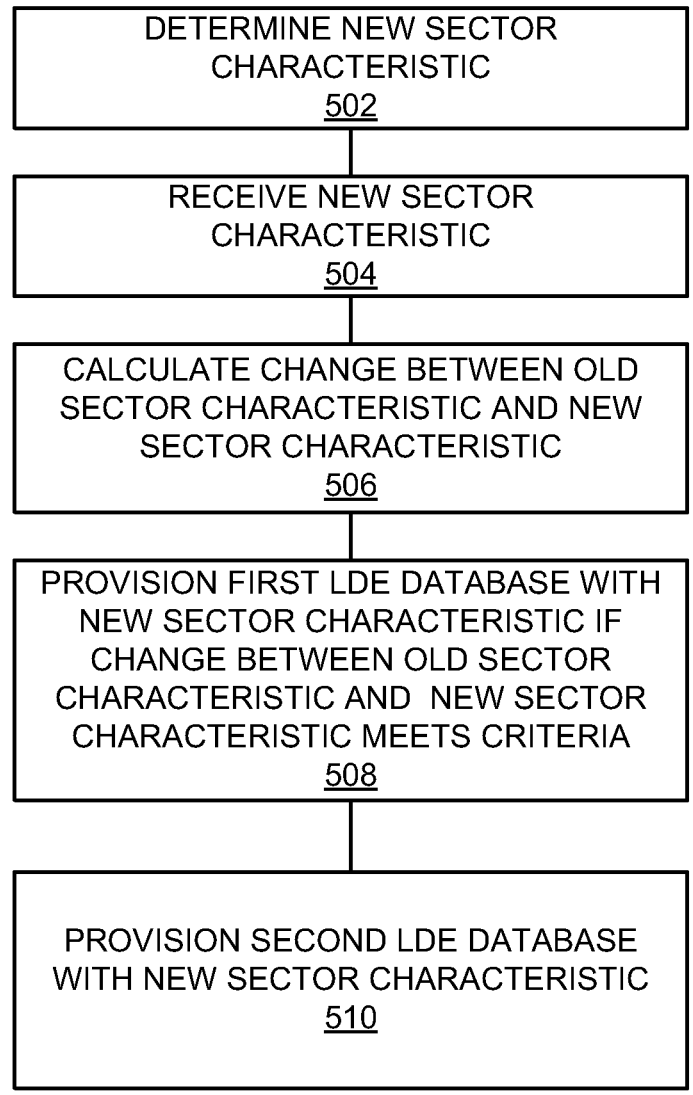
FIG. 5 illustrates a flow chart of a method of provisioning location determination system with sector characteristics.

FIG. 5 illustrates a flow chart of a method of supplying sector characteristics to location determination system. These sector characteristics may include location information that is used by LDS 394 to determine the location of callers such as caller 350.

In a step 502, a new sector characteristic is determined. This may be caused or a result of a change in location information for a cell sector. Examples of changes to location information for a cell sector are discussed, above, in the discussion of FIG. 2. In addition, a new cell sector characteristic may be determined from measurements made by, for example, mobile measuring device 352. For example, mobile measuring device 352 may determine that the centroid of cell sector 334 is not location 344. Instead mobile measuring device 352 may determine that the centroid of cell sector 334 is location 345. This determination is an exemplary change in a cell sector characteristic. Other exemplary types of new location information discussed in the discussion of FIG. 2 and other characteristics such as the shape of the cell sector coverage area, angle of the cell sector coverage pattern, or signal strength map of the cell sector, are further examples of new cell sector characteristics that may be determined.

In a step 504, the new cell sector characteristic is received. For example, the new cell sector characteristic may be transferred to LPS 396 from mobile measuring device 352.

In a step 506, a change between the old sector characteristic and the new sector characteristic is calculated. Examples of changes between the old sector characteristic and the new sector characteristics are given in the discussion, above, of FIG. 2 and the change in location metric.

In a step 508, if the calculated change between the old sector characteristic and the new sector characteristic meets a criteria, a first LID 397 is provisioned with the new sector characteristic. Examples of changes between the old sector characteristic and the new sector characteristics are given in the discussion, above, of FIG. 2 and criteria that a change in location metric may meet. LID 397, and by extension LDS 394, may be provisioned with the new sector characteristic by LPS 396.

In a step 510, a second LDS database 398 is provisioned with the new sector characteristic. The second LDS database 398 is provisioned with the new sector characteristic even if the first LDS database fails to meet the criteria and is not provisioned with the new sector characteristic.

Figure 6:
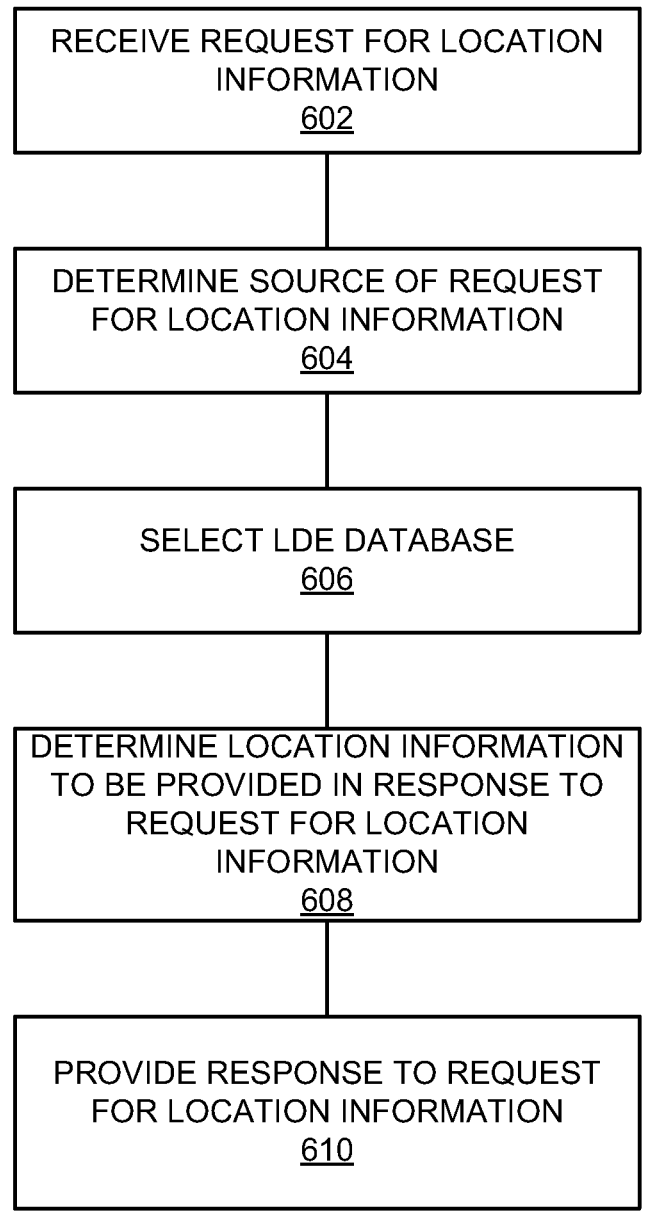
FIG. 6 illustrates a flow chart of a method that provides location information.

FIG. 6 illustrates a flow chart of a method that provides location information. In a step 602, a request for location information is received. For example, this request for location information may be communicated to LDS 394 via communication network 392 and may originate from PSAP 393, LBS 380, caller 350, or mobile measuring device 352.

In a step 604, the source of the request for location information is determined. The source of the request for location information may be determined by the type of request for location information, the content requested, or by some other unique characteristic. For example, location information requests by PSAP 393 are generally associated with a key that is utilized during a call to emergency services (such as a 911 call) to correlate information on the call by a wide variety of network elements in communication network 300. Therefore, when a request for location information contains a reference to a key of the type used correlate information on emergency services call, it can be determined that the source of the request for location information is a PSAP 393.

Another example would be a request for location information that requests the location of a base station 322. In communication network 300, a request for this type of location information might, for example, only be associated with requests from mobile measuring device 350. Therefore, it could be determined that the source of a request asking for this type of information was a request by a mobile measuring device 350.

In another example, a request for location information may ask for the location information to be supplied in Universal Transverse Mercator (UTM) coordinate system format. In communication network 300, a request for the location information to be supplied in UTM format might, for example, only be associated with requests from LBS 380. Therefore, it could be determined that the source of a request asking for the location information to be supplied in UTM for was a request by LBS 380.

In a step 606, LDS 394 selects which LID, 397 or 398, it will use to service the request for location information. The selection of which LID 397 or 398 may be made based upon the source of the request. For example, if the request if from a PSAP 393, the LDS 394 may select first LID 397 because it only contains location information that has met all of the regulatory requirements (such as consent by a PSAP or a drive test) required of location information that is supplied to PSAPs. In another example, the LDS 394 may select second LID 398 because the request came from LBS 380 and LBS 380 desires the most recent location information to provide a service.

In a step 608, the location information to be provided in response to the request for location information is determined. The location information to be provided in response to the request is determined, at least in part, on information provided by the selected LID 397 or 398. In a step 610, a response is provided to the request for location information.

The methods described above may be implemented or executed by one or more computer systems. The methods described above may also be stored on a computer readable medium. Many of the elements of communication network 100 and communication network 300 may be, comprise, or include computers systems. This includes, but is not limited to caller 101, communication network 120, PSAP 130, LDS 140, LPS 160, LID 150, LDS 394, LPS 396, computer system 370, caller 350, LID 397, LID 398, base stations 322 and 324, communication network 392, LBS 380, and mobile measuring device 352.

Figure 7:
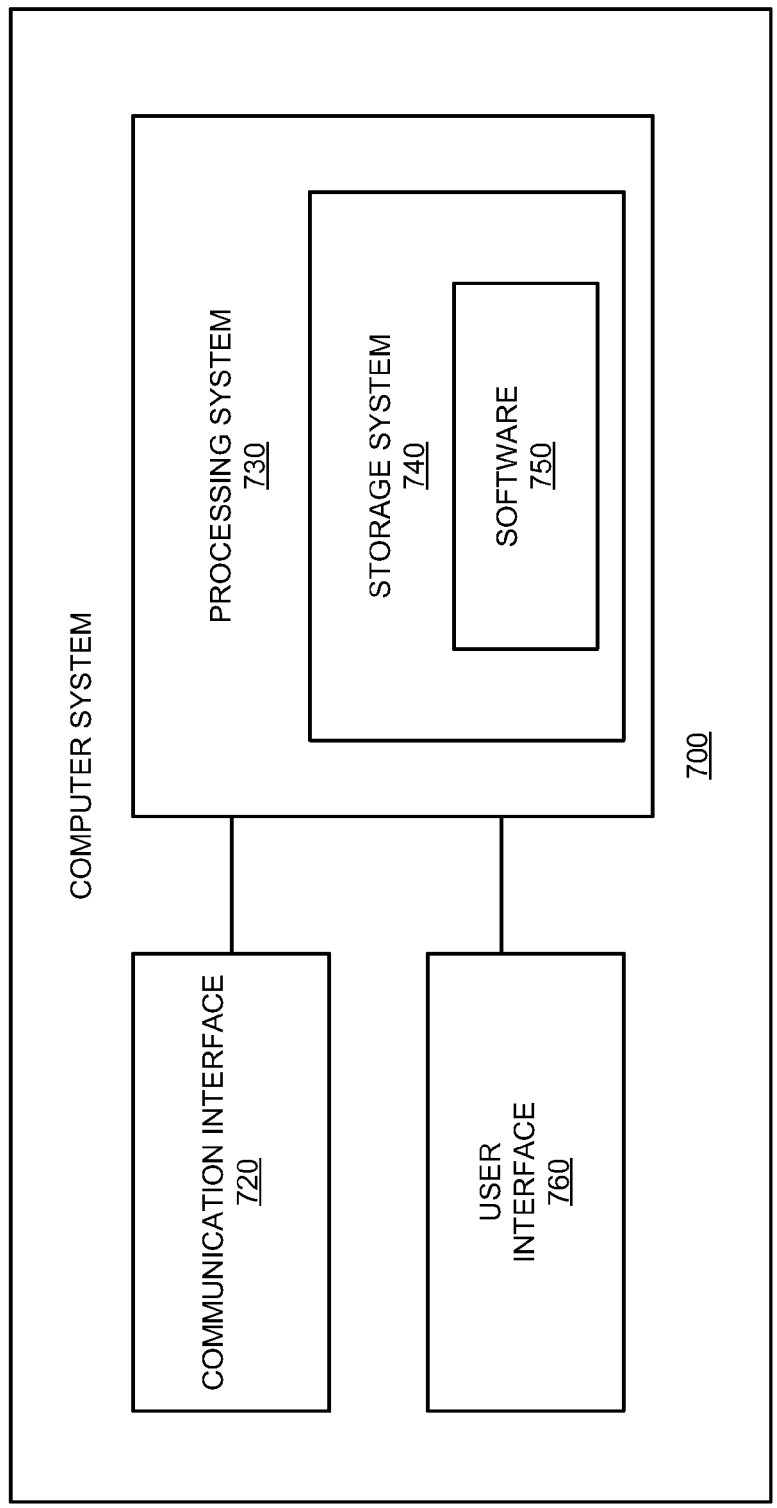
FIG. 7 is a block diagram illustrating a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of provisioning a location determination system having a first database which is initially provisioned with a first location information, wherein the first database comprises location information that complies with a regulatory scheme and the regulatory scheme comprises requirements for location information supplied to an emergency service provider, comprising:
   receiving a second location information that is different from the first location information being used by the location determination system, wherein the first location information and the second location information comprise information related to a location of a base station;
   determining a location change metric based upon the first location information and the second location information;
   provisioning a second database of the location determination system with the second location information if the location change metric meets a criteria, wherein the second database comprises at least one entry of location information that does not comply with the regulatory scheme;
   receiving a location information request;
   determining a source of the location information request; and
   selecting either the first location information or the second location information to service the location information request based on the source of the location information request, wherein the first location information is selected when the source comprises an emergency service provider.

2. The method of claim 1 wherein the location change metric corresponds to a distance between locations represented by the first location information and the second location information.

3. The method of claim 1 wherein the source comprises the emergency service provider when the location information request is associated with a key for a call to emergency services.

4. The method of claim 1 wherein the second location information results from a measurement made by a mobile device.

5. The method of claim 1 wherein the second location information corresponds to a point in a cell phone sector.

6. A provisioning system, comprising:
   a first information transfer link that receives first location information and second location information wherein the first location information is different from the second location information, the second location information is used by a location determining system, and the first location information and the second location information comprise information related to a location of a base station;
   a location change metric determining system that determines a location change metric based upon the first location information and the second location information;
   a second information transfer link that communicates the second location information to the location determining system if the location change metric meets a criteria; and
   wherein the location determining system receives a location information request, determines a source of the location information request, and selects either the first location information or the second location information to service the location information request based on the source of the location information request, wherein the first location information is provisioned to a first database comprising location information that complies with a regulatory scheme comprising requirements for location information supplied to an emergency service provider, the second location information is provisioned to a second database comprises at least one entry of location information that does not comply with the regulatory scheme, and the first location information is selected when the source comprises the emergency service provider.

7. The provisioning system of claim 6 wherein the location change metric corresponds to a distance between locations represented by the first location information and the second location information.

8. The provisioning system of claim 6 wherein the source comprises the emergency service provider when the location information request is associated with a key for a call to emergency services.

9. The provisioning system of claim 6 wherein the second location information results from a measurement made by a mobile device.

10. A non-transitory computer readable medium encoded with computer instructions which when executed cause a computer to perform method steps for provisioning a location determination system which is initially provisioned with a first location information, comprising:
    receiving a second location information that is different from the first location information being used by the location determination system, wherein the first location information and the second location information comprise information related to a location of a base station;

determining a location change metric based upon the first location information and the second location information;

provisioning the location determination system with the second location information if the location change metric meets a criteria; and wherein the location determining system receives a location information request, determines a source of the location information request, and selects either the first location information or the second location information to service the location information request based on the source of the location information request, wherein the first location information is provisioned to a first database comprising location information that complies with a regulatory scheme comprising requirements for location information supplied to an emergency service provider, the second location information is provisioned to a second database comprises at least one entry of location information that does not comply with the regulatory scheme and the first location information is selected when the source comprises the emergency service provider.

11. The non-transitory computer readable medium of claim 10, wherein the location change metric corresponds to a distance between locations represented by the first location information and the second location information.

12. The non-transitory computer readable medium of claim 10, wherein the source comprises the emergency service provider when the location information request is associated with a key for a call to emergency services.

13. The non-transitory computer readable medium of claim 10 wherein the second location information results from a measurement made by a mobile device.

14. The non-transitory computer readable medium of claim 10 wherein the second location information corresponds to a point in a cell phone sector.

* * * * *